US006763701B1

(12) United States Patent
Moretz

(10) Patent No.: US 6,763,701 B1
(45) Date of Patent: Jul. 20, 2004

(54) METHOD AND APPARATUS FOR SEALING AND TESTING A TUBULAR QUICK COUPLING

(76) Inventor: Benny W. Moretz, P.O. Box 80567, Lafayette, LA (US) 70598

( * ) Notice: Subject to any disclaimer, the term of this patent is extended or adjusted under 35 U.S.C. 154(b) by 0 days.

(21) Appl. No.: 10/422,918

(22) Filed: Apr. 23, 2003

(51) Int. Cl.$^7$ .............................. G01M 3/02; F16L 35/00
(52) U.S. Cl. ................................ 73/37; 73/46; 73/49.5; 285/93; 285/89; 285/362; 285/402
(58) Field of Search .............................. 73/37, 46, 49.1, 73/49.5; 285/81, 89, 93, 333, 360, 361, 396, 402

(56) References Cited

U.S. PATENT DOCUMENTS

| | | | | |
|---|---|---|---|---|
| 4,569,540 A | * | 2/1986 | Beson .......................... | 285/93 |
| 4,919,456 A | | 4/1990 | Wong .......................... | 285/39 |
| 4,926,680 A | * | 5/1990 | Hasha et al. .................... | 73/46 |
| 5,222,769 A | * | 6/1993 | Kaempen ..................... | 285/45 |
| 5,665,903 A | | 9/1997 | Moran ........................ | 73/49.5 |

OTHER PUBLICATIONS

Bob Lypkie High Pressure Pipe Union Failed During Pressure Test email blypkie@suncor.com.

* cited by examiner

Primary Examiner—Daniel S. Larkin
(74) Attorney, Agent, or Firm—Robert N. Montgomery

(57) ABSTRACT

A quick-coupling union for oil and gas tubular members that provides a more stable joint connection, a redundant seal arrangement, and a method for pressure testing the seals. The union and sealing arrangement includes an elongated tubular receiving member, further including a central longitudinal cavity therein for receiving an elongated tubular insertion member and an external port in communication with the cavity, at least two sealing members located within the cavity defined by the insertion and receiving members and the dual seals being capable of providing a positive seal between the insertion member and the receiving member the union, further including a nut slidable upon the insertion member for threadably locking the insertion member relative to the receiving member, the sealing members being spaced apart in a manner whereby the external port is interposed between the dual sealing members when the union is fully engaged, thus defining a means for applying a pressure there upon.

8 Claims, 3 Drawing Sheets

METHOD AND APPARATUS FOR SEALING AND TESTING A TUBULAR QUICK COUPLING b 1.0 FIELD OF THE INVENTION

This invention relates generally to union-type quick couplings and more particularly to couplings for high-pressure oil and gas pipe and tubes. The invention is directed to both method and apparatus for providing seal redundancy and insuring the integrity of seals used with such couplings.

2.0 GENERAL BACKGROUND

Union-type couplings are generally used to connect joints of pipe used in temporary test operations conducted at a well site. The union, or quick, couplings provide a faster method for repetitiously making up and breaking down the various pipe and tube configurations used for well testing, completion, and work-over operations.

It is required that prior to pressurizing such well head configurations with well pressure, the test configuration must be pressure tested to the expected well pressure to insure joint seal integrity. This pressure test procedure becomes quite burdensome and time consuming when only one joint is disassembled repeatedly during the test procedure as a result of having to retest the entire string of pipe joints. It would, therefore, be advantageous to have the ability to pressure test the seals in any given coupling in the string, requiring only a fraction of the time.

3.0 SUMMARY OF THE INVENTION

The instant invention provides a quick coupling union for oil and gas tubular members that provide a more stable joint connection, a redundant seal arrangement, and a method for pressure testing the seals. The union and sealing arrangement includes an elongated tubular receiving member, further including a central longitudinal cavity therein for receiving an elongated tubular insertion member and an external port in communication with the cavity, at least two sealing members located within the cavity defined by the insertion and receiving members and the dual seals being capable of providing a positive seal between the insertion member and the receiving member. The union further includes a nut slidable upon the insertion member for threadably locking the insertion member relative to the receiving member, the sealing members being spaced apart in a manner whereby the external port is interposed between the dual sealing members when the union is fully engaged, thus defining a means for applying a pressure there upon at least equal to the rated pressure of the union and or the anticipated applied pressure rating of the tubular members being attached by the union coupling.

4.0 BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

Figures 1, 2:
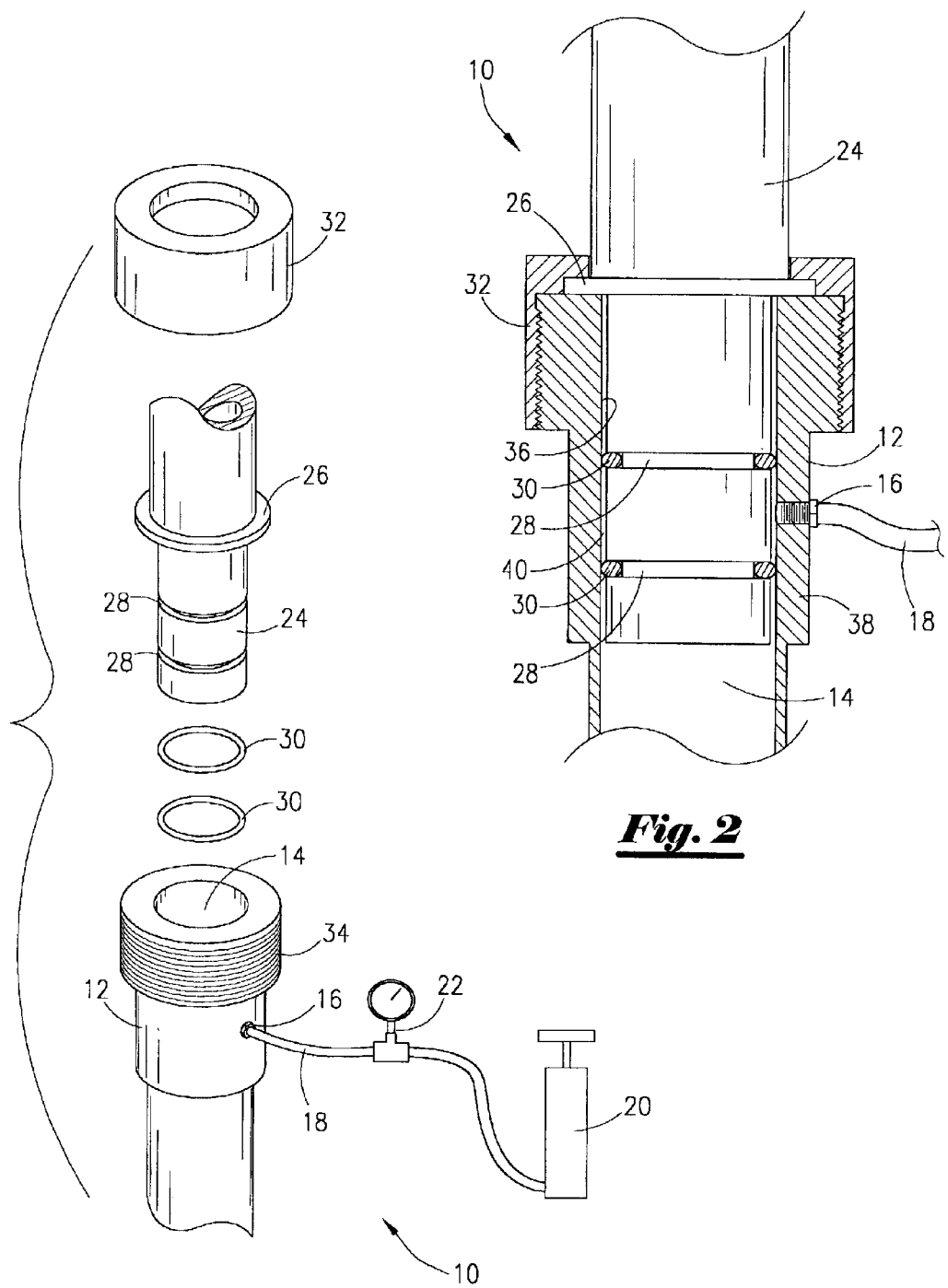
FIG. 1 is an isometric exploded view of a first embodiment of the invention.
FIG. 2 is a vertical cross-section view of the first embodiment shown in FIG. 1.

5.0 DETAILED DESCRIPTION OF THE PREFERRED EMBODIMENT 5.1 As shown in FIG. 1, we see the first embodiment of a union-type quick coupling assembly 10 that includes an elongated, externally threaded, tubular receiving member 12 having a central bore 14 therein and a pressure port 16 that is in communication with the central bore 14 of the tubular, to which may be connected a hose 18, a hand pump 20, and a pressure gauge 22. The coupling assembly 10 further included an insertion member 24 fitted with a collar 26 and dual O-ring grooves 28, a pair of sealing rings 30, and a connecting nut 32 cooperative with the threaded portion 34 of the receiving member 12.

5.2 As may be seen in the assembly view of FIG. 2, the first embodiment of the invention indicates that the dual seals 30 provide a positive seal between the exterior surfaces of the insertion member 24 with an interior wall 36 of the receiving member 12. As previously mentioned, the port 16 penetrates the wall 38 of the receiving member 12 at a point approximately midway between the dual seals 30, thereby providing an external gas or liquid communication with a space 40 surrounding the insertion member 24 defined by the dual seals 30 and the external surface of the insertion member and the internal wall 36 of the receiving member 12. The port 16 is normally threaded and plugged until a seal integrity test is required, in which case a hose 18 is threadably attached to the port 16 and, as seen in FIG. 1, to a high pressure pump having a gauge 22 for Indicating applied pressure representative of the expected well pressure. As seen in FIG. 2 and subsequent figures, by pressuring the seals 30 in this manner the integrity of both seals is assured. Furthermore, the extended length of the insertion portion of the insertion member 24, necessitated by providing the dual seals, 30, improves joint rigidity over that of the prior art couplings.

5.3 Having two spaced-apart seals 30 further provides seal redundancy, thus improving safety and system integrity.

Figure 3:
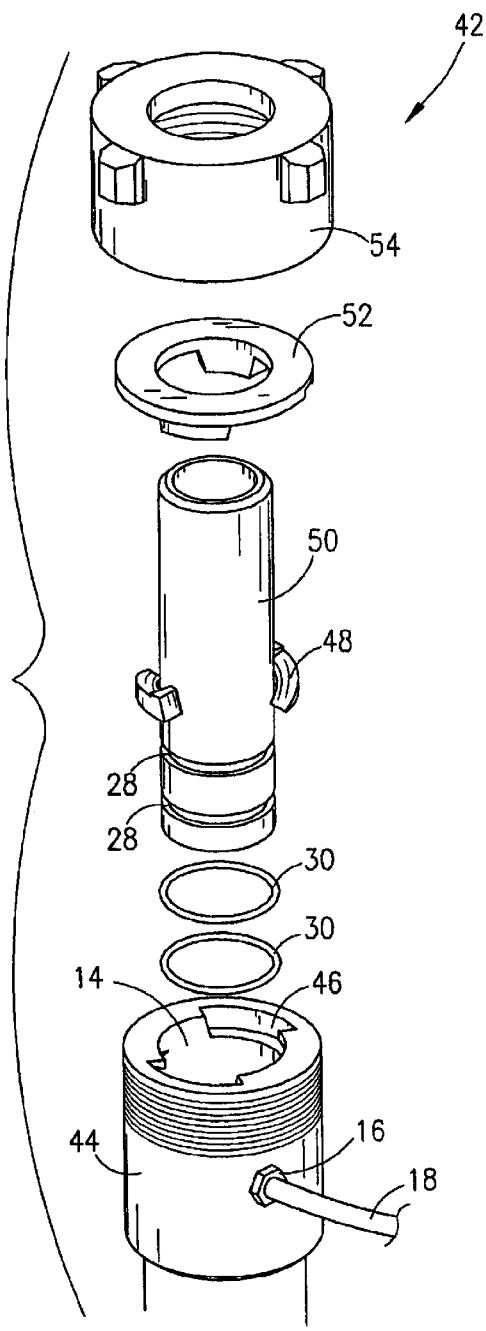
FIG. 3 is an exploded view of a second embodiment of the invention.
Figure 4:
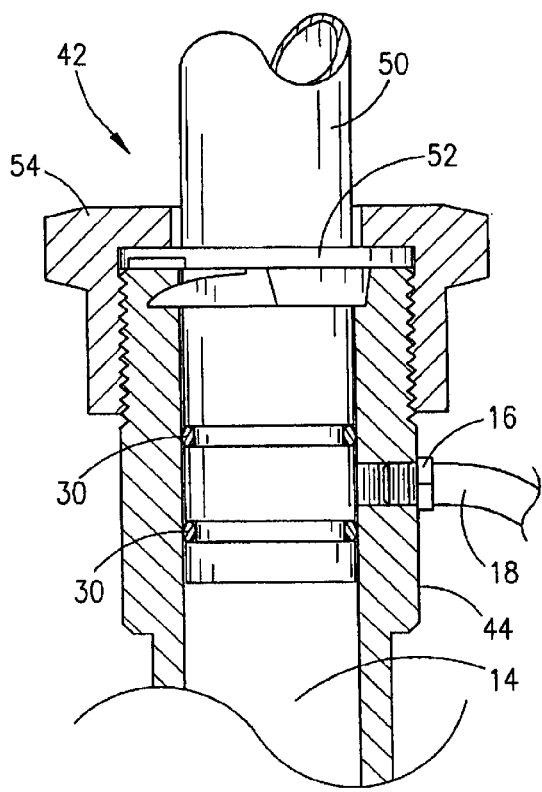
FIG. 4 is a vertical cross-section view of the second embodiment shown in FIG.3.

5.4 Looking now at FIG. 3 and FIG. 4 we see that the dual seal arrangement works equally well with the second embodiment of a locking-type union coupling 42. In this case the receiving member 44 has a central bore 14 that includes internal receiving notches and grooves 46 for accepting a set of external ears 48 located on the external surface of the insertion member 50, which may also be fitted with the dual sealing grooves 28 and seals 30, the insertion member 50 being locked in its engagement with the receiving member 44 by a lock ring 52 and lock nut 54, thereby blocking reverse rotation of the twist lock arrangement. In this case longitudinal tinsel stresses may be placed on the insertion and receiving members 50, 44 without subjecting the locking nut 54 to stress. As further seen in FIGS. 3 and 4 the dual seals 30 are located sufficiently below the twist-locking ears 48 to prevent interference or pose a problem for the seals 30 when rotating the insertion member 50 during the twist-locking operation.

Figures 5, 6:
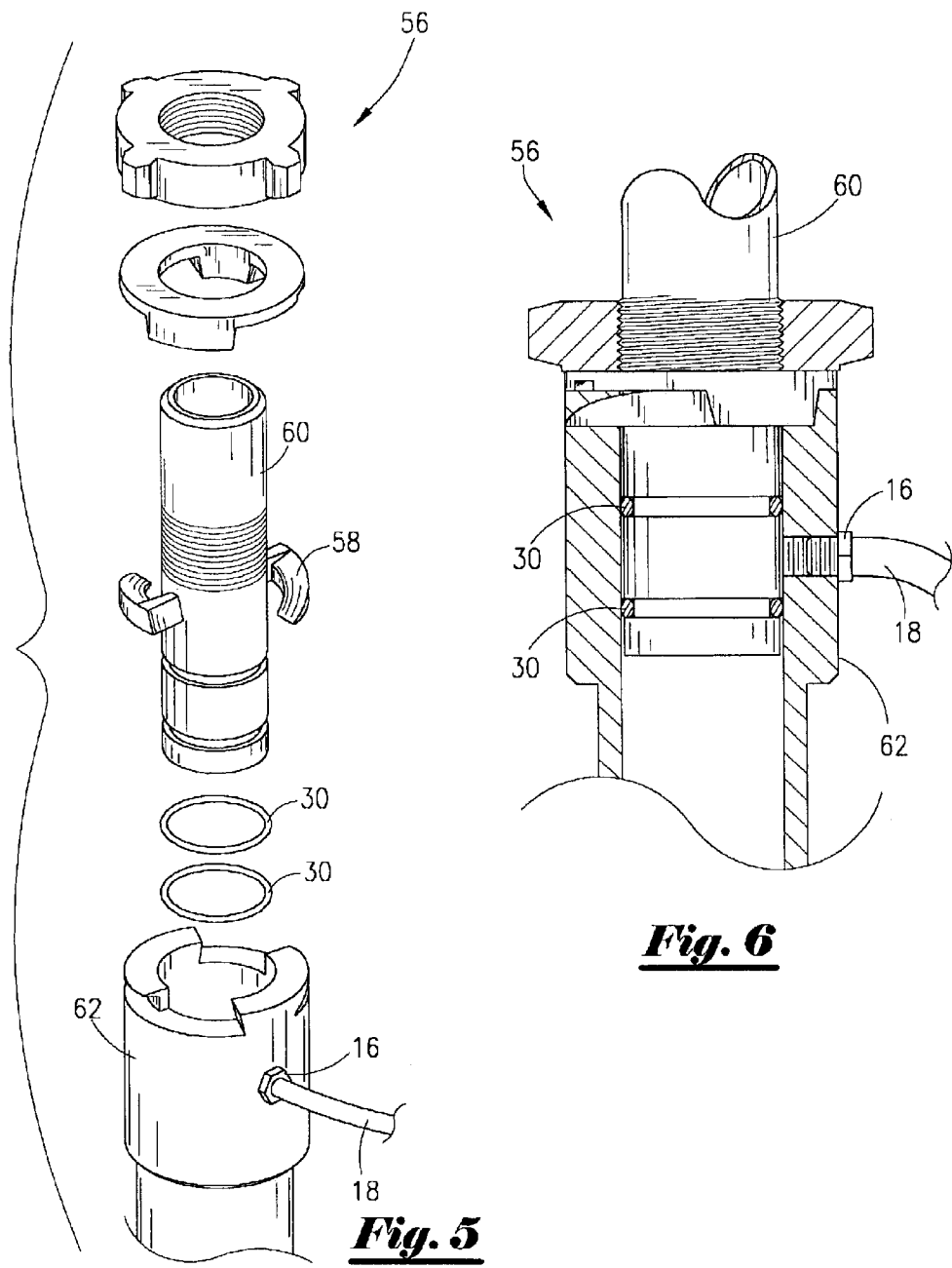
FIG. 5 is an exploded view of a third embodiment of the invention.
FIG. 6 is a vertical cross-section view of the third embodiment shown in FIG. 5.

5.5 Likewise, the seals 30 may be utilized on locking couplings that utilize an external locking arrangement 56, such as that seen in FIGS. 5 and 6. In such cases the twist-locking ears 58 extend from the insertion member 60 in a manner whereby locking engagement with the receiving member 62 takes place externally, thereby further removing the seals 30 from the possibility of damage during the engagement and locking operation of the coupling 56.

5.6 It should be understood that by providing a quick union-type coupling, particularly for large tubular members, whereby the insertion member extends well within a cavity of the receiving member and the application of dual seals to the coupling members in a manner whereby the seals 30 can be pressure tested, represents a significant advantage over the prior art and improves the safety and economics involved with handling specialty tubular members in the oil and gas industry. Therefore, such sealing and testing arrangements may vary from coupling to coupling and are certainly anticipated by this concept.

5.7 Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A quick-coupling union sealing arrangement comprising an elongated tubular receiving member having a central longitudinal cavity therein for receiving an elongated tubular insertion member and an external port in communication with said cavity; at least two sealing members located within said cavity capable of providing a positive seal between said insertion member and said receiving member; and a nut slidable upon said insertion member for threadably locking said insertion member relative to said receiving member, said sealing members being spaced apart in a manner whereby said port is interposed between said at least two sealing members, thus defining a means for applying a pressure upon said sealing members.

2. The quick-coupling union sealing arrangement according to claim 1 wherein said sealing members are O-ring seals located upon the exterior of said insertion member.

3. The quick-coupling union sealing arrangement according to claim 1 wherein said port is threaded and a plug is installed.

4. A quick-coupling union sealing arrangement comprising:

a) an elongated tubular insertion member having at least two external sealing members spaced apart thereon;

b) an elongated tubular receiving member having a central longitudinal cavity for receiving said insertion member and an external port in communication with said cavity, said sealing members capable of providing a positive seal between said insertion member and said receiving member; and c) a nut slidable upon said insertion member for threadably locking said insertion member relative to said receiving member.

5. The quick coupling union sealing arrangement according to claim 4 wherein said external port communicates with said central cavity at a point mesial said spaced apart seals when said insertion member is located within said cavity.

6. A quick coupling union sealing arrangement comprising:

a) an elongated tubular insertion member having at least two external sealing members spaced apart thereon;

b) an elongated tubular receiving member having a central longitudinal cavity for receiving said insertion member and an external port in communication with said cavity, said sealing members capable of providing a positive seal between said insertion member and said receiving member, said receiving member having a twist-locking means for rotatably locking said insertion member to said receiving member;

c) a lock ring member slidable upon said insertion member having means for blocking rotation of said twist locking means; and c) a nut slidable upon said insertion member for threadably locking said insertion member relative to said receiving member.

7. The quick-coupling union sealing arrangement according to claim 6 wherein said external port communicates with said central cavity at a point mesial said spaced apart seals when said insertion member is located within said cavity.

8. A method for testing the integrity of a quick coupling union sealing arrangement comprising the steps of:

a) connecting a high pressure pump to a quick coupling union having an external port in communication with a cavity within said coupling, the cavity further defined by a pair of spaced apart seals when the union is fully engaged; and b) applying pressure to said spaced apart seals at least equal to the rated pressure of said union in a manner whereby the integrity of said seals is ensured.

* * * * *